United States Patent
Wilk

(10) Patent No.: US 6,643,124 B1
(45) Date of Patent: Nov. 4, 2003

(54) MULTIPLE DISPLAY PORTABLE COMPUTING DEVICES

(76) Inventor: Peter J. Wilk, 185 West End Ave., New York, NY (US) 10023

(*) Notice: Subject to any disclaimer, the term of this patent is extended or adjusted under 35 U.S.C. 154(b) by 35 days.

(21) Appl. No.: 09/635,103

(22) Filed: Aug. 9, 2000

(51) Int. Cl.[7] .................................................. G06F 1/16
(52) U.S. Cl. ....................... 361/681; 361/682; 361/683; 312/223.1; 312/223.6; 345/169
(58) Field of Search ................................. 361/681, 683, 361/682, 679, 680; 312/223.1, 223.2, 265.6; 248/535, 536, 917; 345/169, 905, 101, 173; 455/556, 566

(56) References Cited

U.S. PATENT DOCUMENTS

| | | | | |
|---|---|---|---|---|
| 5,249,967 A | * | 10/1993 | O'Leary et al. | 434/247 |
| 5,646,649 A | * | 7/1997 | Iwata et al. | 345/173 |
| 5,905,964 A | * | 5/1999 | Sudo | 455/566 |
| 5,923,307 A | * | 7/1999 | Hogle, IV | 345/4 |
| 5,956,046 A | * | 9/1999 | Kehlet et al. | 345/502 |
| 6,046,709 A | * | 4/2000 | Shelton et al. | 345/1 |
| 6,047,196 A | * | 4/2000 | Makela et al. | 455/556 |
| 6,144,358 A | * | 11/2000 | Narayanaswamy et al. | 345/102 |
| 6,229,514 B1 | * | 5/2001 | Larson | 345/101 |
| 6,233,469 B1 | * | 5/2001 | Watanabe | 455/575 |
| 6,269,256 B1 | * | 7/2001 | Nakamura | 455/567 |
| 6,297,945 B1 | * | 10/2001 | Yamamoto | 361/681 |
| 6,302,612 B1 | * | 10/2001 | Fowler et al. | 403/76 |
| 6,313,880 B1 | * | 11/2001 | Smyers et al. | 348/552 |
| 6,327,482 B1 | * | 12/2001 | Miyashita | 455/566 |

FOREIGN PATENT DOCUMENTS

| | | | | | |
|---|---|---|---|---|---|
| JP | 407160363 A | * | 6/1995 | | G06F/1/16 |
| JP | 408054962 A | * | 2/1996 | | G06F/1/16 |
| JP | 408263174 A | * | 10/1996 | | G06F/1/16 |
| JP | 409258844 A | * | 10/1997 | | G06F/1/16 |
| JP | 411149328 A | * | 6/1999 | | G06F/1/16 |

* cited by examiner

*Primary Examiner*—Michael Datskovsky
(74) *Attorney, Agent, or Firm*—R. Neil Sudol; Henry D. Coleman; William J. Sapone

(57) ABSTRACT

A portable computing device is equipped with multiple display panels. The display panels and hinged, jointed or otherwise disposed to rotate or slide with respect to one another in a transition from a compact configuration to an expanded configuration. In a basic embodiment three output screens take a form of a triptych for which an input panel forms a base. The output panels are deployed with a bend when opened and images angled in towards an observer. The display panels comprise a main panel and two auxiliary panels. In a variation a forth display panel is rotatably or foldably joined to the central display panel so that a total of four display panels may be deployed in a hub and petal configuration. The side panels may be eliminated from the four panel embodiment so that the input panel and two remaining display panels form a vertically orientable triptych with the input panel serving as base.

8 Claims, 3 Drawing Sheets

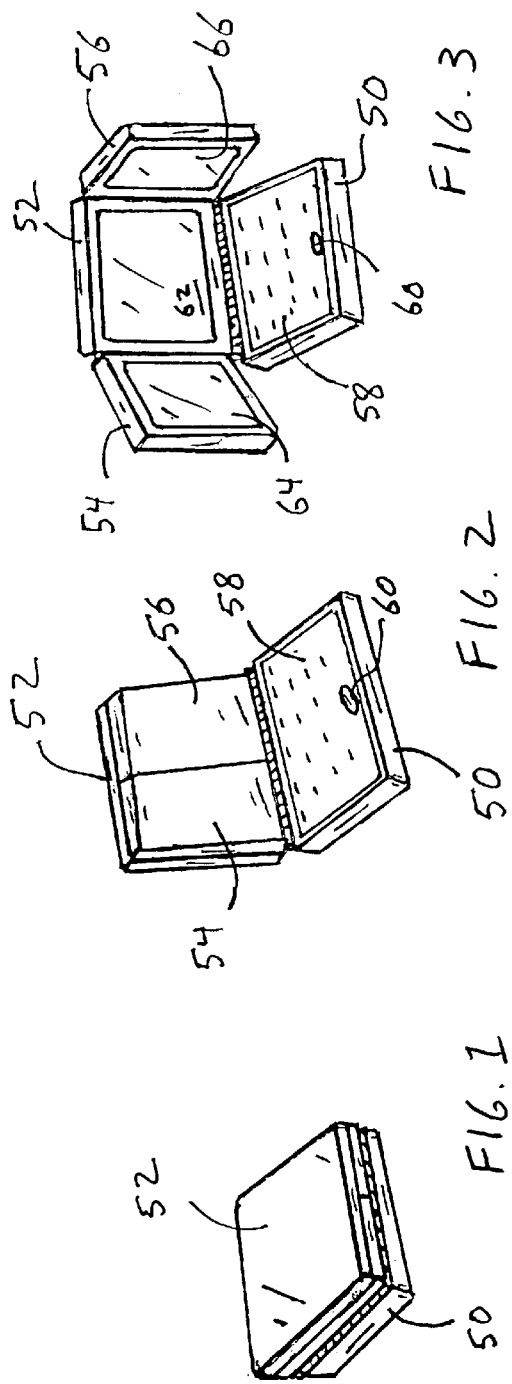
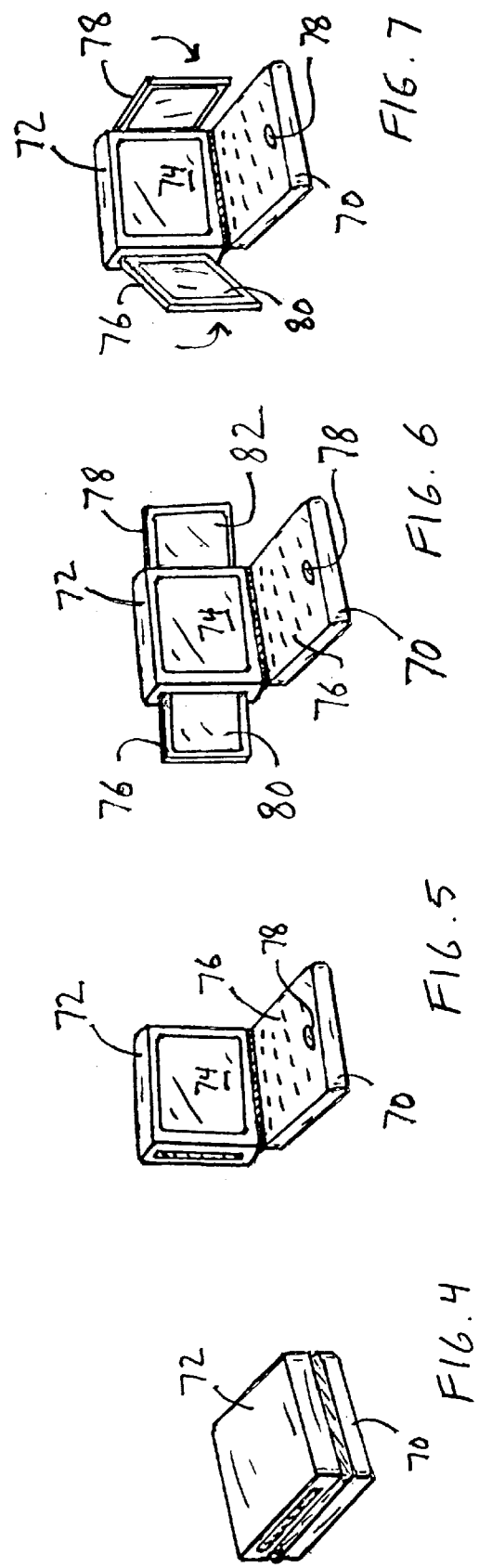

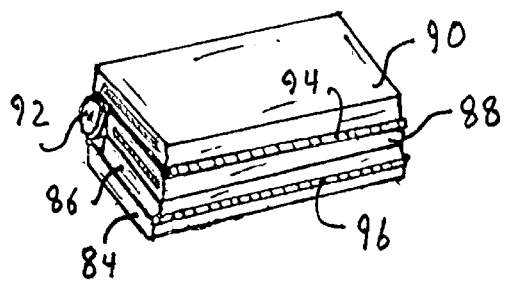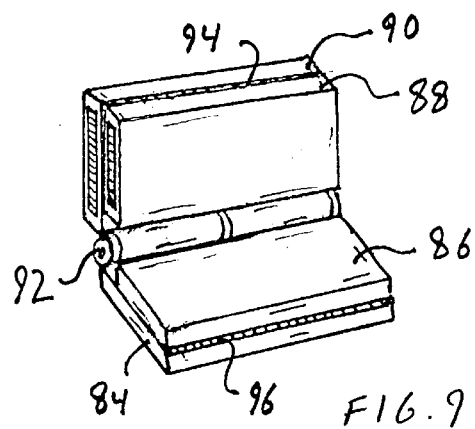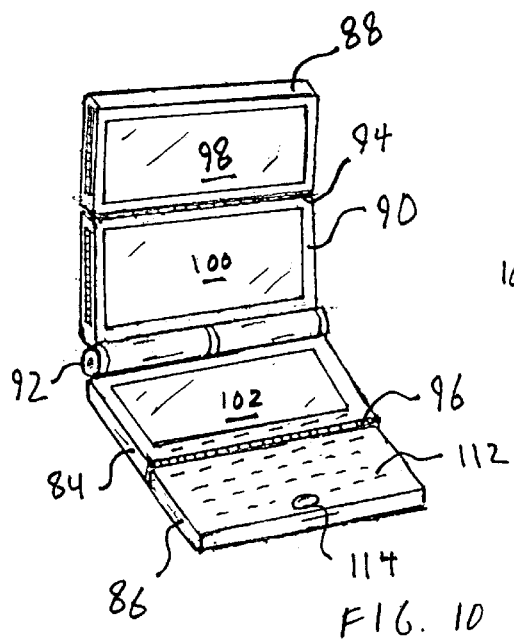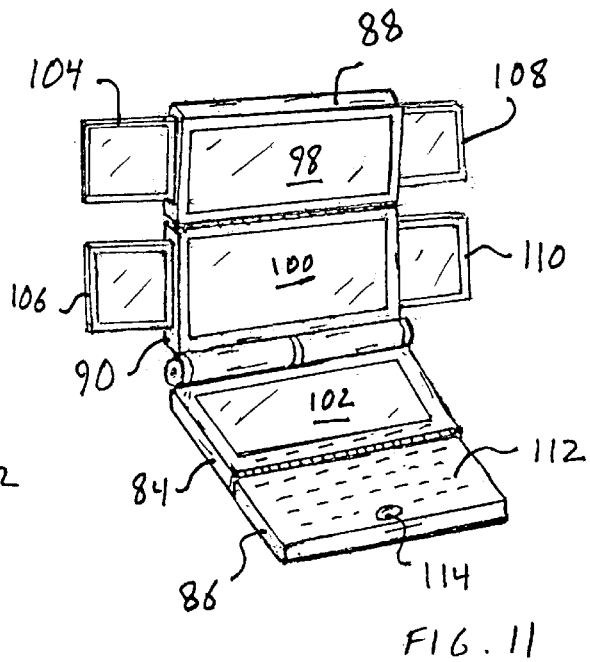

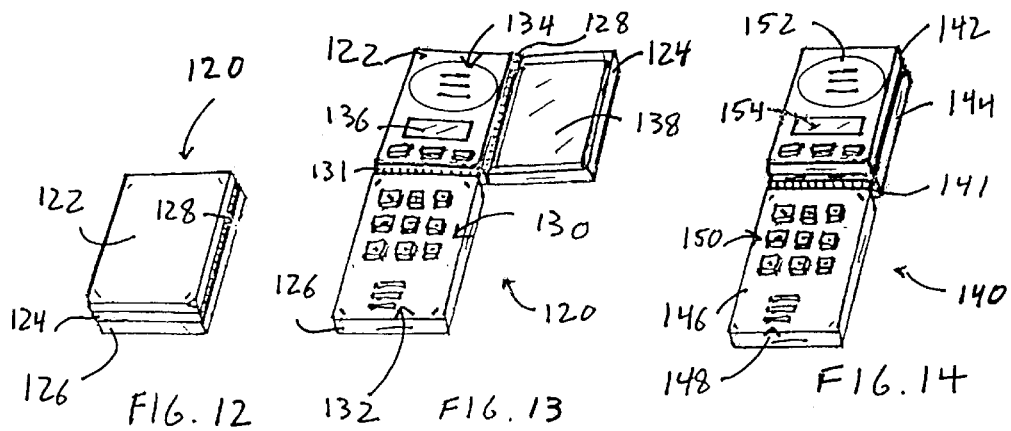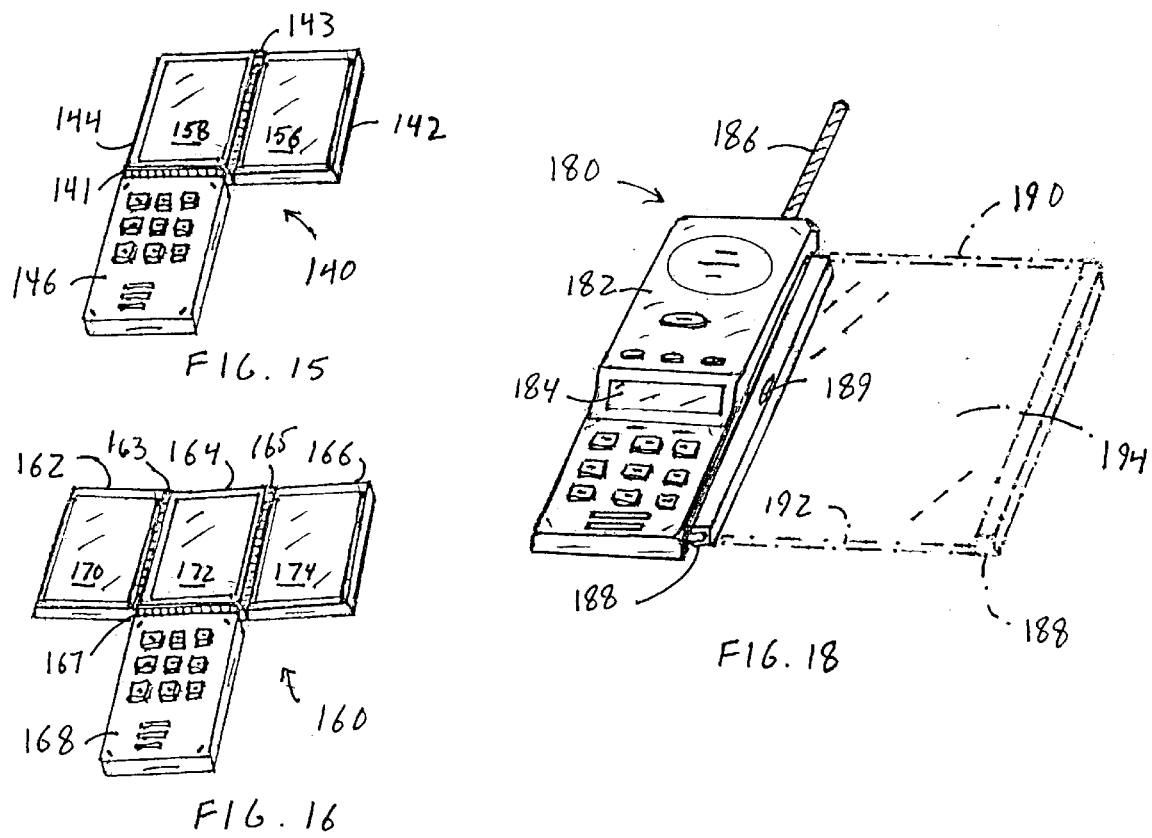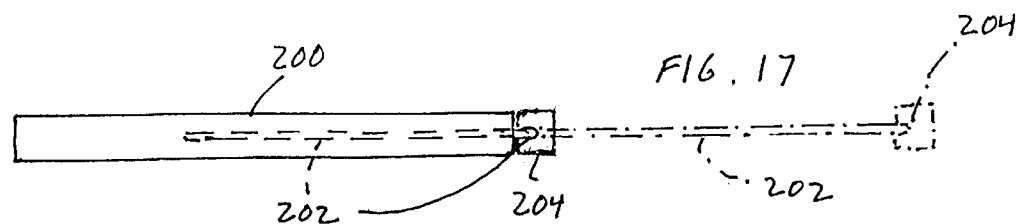

MULTIPLE DISPLAY PORTABLE COMPUTING DEVICES

FIELD OF THE INVENTION

This invention relates to computing devices. In particular, this invention relates portable computing devices, and to computer output display devices.

1. Baclground of the Invention

Personal computers have made huge strides in processor speed and static and dynamic memory costs in the last decade. Computer display technology however, while enjoying incremental improvements and a gradual decline in price, has not yet followed suit. Large high quality flat screen displays remain prohibitively expensive to manufacture because of residual manufacturing defect concentration and a simple mathematical relation which makes a mean number of expected defects per screen proportional to an area of that screen, meaning that a chance of manufacturing a defect-free display steadily declines with an area of that display. Large area CRT displays are less expensive, though still not having declined in cost in proportion to other computer resources, but are also bulky and occupy a volume which grows roughly as a cube of a linear display dimension. Large CRT displays are definitely not portable. Even high-end CRT displays leave something to be desired in ease of use and configuration, becoming essentially immovable appliances rather than an item of the physical desktop which can be arranged to suit the operator.

2. Summary of the Invention

In the description which follows, the term "computing device" shall mean any device capable of performing computations or logical operations on an instruction set at least partially by electronic means, while the word "portable" means capable of being carried by a man, including but not limited to devices intended for routine movement from place to place, and also devices intended for semi-permanent installation on a desktop or work surface, which may be moved from time to time. The term "input panel" is used herein to denote any generally flat device which enables a user to make inputs to a computing device, including but not limited to keyboards, keyboards equipped with "track balls", touch sensitive screens and numeric entry pads. The term "portable computing devices" is used herein to designate generally laptop and "palm top" personal computers, "personal digital assistants", and also special purpose portable electronics, including but not limited to surveying assistance devices and portable communications equipment at least partially embodying electronic logic or digital signal processing functions, including cellular telephones, and in particular cellular telephones with Internet access. The term "display panel" denotes herein any generally flat device for the transient representation of data, including LED and electroluminescent display screens. The term "output panel" as used in this disclosure is generally synonymous with a display panel, but may also include speakers or other output devices. Generically, both input panels and output panels found in a hinged or multiple leaved portable computing device are called "functional panels". A single functional panel may serve as both an input and output panel in some applications. When it is advantageous to emphasize this dual functionality, a panel may be referred to as a "multi-function panel". A multi-function panel may comprise two functions on a single face thereof, or show functionality on both an obverse and a reverse, that is, on both a front face and a rear face respectively. The "face" of a display panel will be understood to be a side showing primarily a display function, if not otherwise specified.

In a context of computer display devices, a "window" shall have a customary meaning in this application, namely a defined area of output generated by a given program or process, with a peripheral appearance and standardized behavior controlled by an operating system common to a set of such windows.

Pursuant to the present invention, a portable computing device is equipped with multiple functional panels, at least two of which have a display function. The display panels are hinged, jointed or otherwise disposed to rotate or slide with respect to one another in a transition from a compact, transportable, configuration to an expanded use configuration. Several significant advantages accrue from using multiple movable display panels as opposed to a single rigid panel of equivalent display area.

First of all, flat display pricing is not linear in surface area. Manufacturing defects are more likely to result in rejected display devices the larger a surface area of the device. If a particular manufacturing technology results in 50% of all display panels of area A being discarded at the factory, then a simple scaling of the identical manufacturing technique to panels of area 2A is expected to result in rejection of 75% of the panels. Accordingly, all other cost factors being equal, productivity of the larger panels per pixel, that is, per display area, is half that of the smaller panels, and the cost of the larger panel is twice that of using two smaller displays.

Second, large displays may defeat the purpose of portability. Flat displays are rigid and a large single panel display places a lower limit on dimensions of the portable device. A multiple display device of equivalent total display area may be folded into a more nearly cubical shape with smaller maximum dimension than a single display device. A multiple display device with foldable or otherwise disposable display panels may also be adapted to a limited available space for use by a selective deployment of the display panels as needed or as possible.

Third, multiple display panels of a total effective surface area equivalent to that of a large single panel generally present information more effectively and attractively than a single display. A window of ⅓ the total area of a single display has linear dimensions 0.577 of those of the parent display. There is no way to tile three such windows of the same aspect ratio as a parent screen on the parent, and centering a single such window leaves a border of less than ¼ of the original screen dimensions, which is difficult to effectively use for the display of information. Information on a single screen is also more difficult to visually differentiate than when presented on multiple adjacent displays and results more quickly in eye fatigue when repeatedly shifting attention between windows, as the eye may lack sufficient cues to enable an effortless shifting of attention.

Fourth, a single flat display panel necessarily involves a greater variation in angle of gaze relative to a surface normal of the panel compared to a multiple panel display, which may be angled inward towards the viewer or user in a "wrap-around" configuration.

Fifth, multiple displays allow an adaptation of display type to intended function, with a consequent cost reduction. A multiple display device may provide a single high-resolution color display panel for viewing of digital images and one or more less expensive monochromatic displays for data and word processing. Lower resolution may also be comfortably accepted in a display intended only to present legible alphanumeric characters rather than color or gray scale images. A text-only screen may also take advantage of simplified and hence faster video drivers. In general, an economic principle of division of labor is tapped by adapting device capabilities to function rather than providing a sufficient amount of a highest priced and most versatile resource to cover all required functions.

In summary, when presenting multiple blocks or windows of information multiple display screens or panels are often less expensive, more transportable, and more readable than a single display screen of equivalent area. A single display is preferred on the other hand when a large image is required to be displayed contiguously.

In a portable computing device according to the present invention, a multiplicity of flat display panels are movably joined to an input panel to form a collapsible multiple screen device. In a basic embodiment three screens take a form of a triptych for which the input panel forms a separate base panel.

The historical triptych is an artefact or ornament in which three image bearing panels are hinged or jointed along two common vertical edges thereof. In the traditional object the panels may be folded flat to protect and conceal image bearing interior surfaces, or opened to reveal these surfaces. The panels are generally left with a bend when opened rather than made completely coplanar, so that the artefact is self-supporting and the images are angled in towards a common point of view. In a multiple display panel portable computing device in a form of a triptych, three display panels or screens are similarly rotatably or foldably joined along two common vertical edges so as to be foldable into a single compact unit when not in use, with image display surfaces inwards. The display panels comprise a main or central panel and two auxiliary or wing panels. The central panel is in turn rotatably or foldably joined to an input panel along a common horizontal edge so that a complete portable computing device comprising an input panel and three display panels may be folded into a box-like object with input and display surfaces inwards, similar to a conventional laptop computer.

In a variation of the preceding embodiment, a fourth display panel is rotatably or foldably joined to the central display panel along a second horizontal edge, opposite of the common edge joining central panel and input panel, so that a total of four display panels are deployable in a hub and petal configuration. The fourth panel is angled upwards from the central panel of the triptych in use, to form a tetraptych, or four-paneled foldable form. Yet alternatively, the side panels may be eliminated from the just-mentioned four panel embodiment so that the input panel and two remaining display panels form a vertically oriented triptych, with the input panel, in a position of a wing, serving as base. This design may in turn be augmented by an addition of a further functional display or input panel connected to and foldable with the existing ones along an axis parallel to the remaining folding axes in a vertically oriented "Chinese screen" or room-divider configuration. Display capacity of this device may be yet further augmented by an addition of wing screens or side panels to one or both substantially vertically oriented display panels, in analogy to the side panels in the first tripartite screen embodiment of the present invention A functional panel adjacent to the input panel, for stability serving as a element of a horizontal base in a deployed configuration, may be either an extension of the input panel, a display panel or a mixed-use panel. Any of the aforementioned multi-panel displays may also be used as stand-along units, without the input panel, as a peripheral to another computing device.

Another embodiment of the present invention also employs a basic triumvirate of display panels in accordance with the first described embodiment, but disposes the side or wing panels in a slidable rather than rotatable connection with the central display or output panel, so that the wing panels emerge from slots in the central panel. The wings or wing panels are conveniently half the width of the central panel in this embodiment, so that the wings may be contained in a single plane internal to the central panel in a retracted state. The wings are optionally rotatably mounted at a limit of sliding travel so that the wings may be angled inward after preliminary extension.

Use of half-width sliding wing panels results in smaller net screen area for given dimensions of a central display, but has an advantage that the side panels may be selectively deployed as needed in tight spaces. Full width sliding wing panels may also be employed, at a price of a thicker case element or central panel, or employment of more technically advanced thin displays.

A embodiment which folds into a very compact package is realized by further segmenting a single pair of input and central display panel along axes bisecting these now bi-folded panels parallel to their common edge. An overall folded package now shows four layers, and unfolds to form a product resembling a conventional laptop with a horizontally split screen. The split input panel, serving as a base for the unfolded device, may be replaced by half height horizontal input and display panels. In yet a further variation, sliding wings deploy from sides of each half of the vertically oriented split screen, to deploy a total of two or three larger and four smaller display panels, depending on a function of a second half of the horizontal base panel, input or output.

In terms of portable computing devices, the present invention finds particular application to Internet enabled cellular telephones. Using the Internet or a proprietary data source, cellular phones are moving beyond voice only communications to become mobile data relays for a user, supplying sports, weather, news, email and other information. Space is more at a premium in a cellular phone than in a laptop or even palm top computer, and such devices benefit greatly from compact extensible display technologies.

Flexible display screens may also be used as components of multiple display computing devices according to the present invention. A flexible video or display screen may be rolled up in a storage configuration and unrolled and stretched flat by a frame in a usage configuration. Lacking a requirement of rigidity, a flexible screen may be manufactured more thinly, and hence of reduced volume, relative to a rigid display panel. Flexible displays therefore reduce a volume requirement of a compactly folded unit. A flexible screen may in fact be the only way to obtain a given contiguous deployed display area on a small device, such as a cellular phone. Current cellular phone display panels are limited to a few lines of 40 character resolution or less. By combining at least one display in the megapixel range with a hand-held transceiver, cellular phones may fulfill their promise as wireless voice actuated portals to the Internet.

BRIEF DESCRIPTION OF THE DRAWINGS

FIG. 1 is a schematic perspective view of a portable computing device in accordance with the present invention, in a folded configuration.

FIG. 2 is a schematic perspective view of the portable computing device of FIG. 1 in a partially unfolded configuration.

FIG. 3 is a schematic perspective view of the portable computing device of FIG. 1 in a fully unfolded configuration.

FIG. 4 is a schematic perspective view of a second portable computing device in accordance with the present invention, in a compact configuration.

FIG. 5 is a schematic perspective view of the portable computing device of FIG. 4 in a partially deployed configuration.

FIG. 6 is a schematic perspective view of the portable computing device of FIG. 4 in a second partially deployed configuration.

FIG. 7 is a schematic perspective view of the portable computing device of FIG. 4 in a fully deployed configuration.

FIG. 8 is a schematic perspective view of a further portable computing device in accordance with the present invention, in a compact or folded configuration.

FIG. 9 is a schematic perspective view of the portable computing device of FIG. 8 in a partially deployed configuration.

FIG. 10 is a schematic perspective view of the portable computing device of FIG. 8 in a second partially deployed configuration.

FIG. 11 is a schematic perspective view of the portable computing device of FIG. 8 in a fully deployed configuration.

FIG. 12 is a schematic perspective view of a folded cellular phone in accordance with the present invention.

FIG. 13 is a schematic perspective view of the phone of FIG. 12, shiowing that phone in a folded-out configuration.

FIG. 14 is a schematic perspective view of a partially unfolded configuration of a modification of the phone of FIG. 13.

FIG. 15 is a schematic perspective view of the fully unfolded phone of FIG. 14.

FIG. 16 is a schematic perspective view of yet an additional modification of the cellular phone of FIG. 13, showing the modification in a fully unfolded configuration.

FIG. 17 is a schematic elevational view of a functional panel of a computing device in accordance with th present invention, showing an attached sliding frame for a flexible display screen.

FIG. 18 is a schematic perspective view of a portable radio transceiver employing the flexible display screen of FIG. 17.

DETAILED DESCRIPTION OF THE EMBODIMENTS

A portable personal computer or computing device is generally shown in FIG. 1 in a folded or compact configuration, showing combined functional panels (as defined above) and case elements 50, 52. The portable computing device of FIG. 1 is shown in a partially unfolded or deployed configuration in FIG. 2. Case element 50 is an input panel, with keyboard 58 and trackball 60, while case element 52 is overlaid on an inside surface (not designated) by additional internal case elements or functional panels 54, 56. In FIG. 3, the portable computer of FIGS. 1 and 2 is shown in a fully unfolded or deployed configuration, revealing case elements 52, 54 and 56 to be output panels respectively provided with flat screens 62, 64 and 66. Panels 52, 54 and 56 constitute a triptych, or three paneled foldable device, with a compact configuration protecting sensitive inner surfaces, in this case represented by screens or flat displays 62, 64, 66. Panels 54, 56 form auxiliary panels or wings, joined foldably or hingedly to central or main panel 52, at common vertical edges thereof. Input panel 50 serves as a base or pedestal to the unfolded or deployed portable computer.

A second foldable portable computer generally shown in a compact or folded configuration in FIG. 4 incorporates combined case elements and functional panels 70, 72. A partially unfolded or deployed configuration of the portable computer of FIG. 4 is shown in FIG. 5, with case element 72 revealed to be a display or output panel with flat screen 74, while case element 70 carries a keyboard 76 and trackball 78, similar to a now conventional "laptop" portable computer. However, in FIG. 6, the computer of FIGS. 4 and 5 is revealed to have side or auxiliary panels or wings 76, 78 which are slidingly deployable from functional panel 72. Panels 76, 78 are output panels featuring display screens 80, 82. In a fully deployed configuration of the portable computer of FIGS. 4–6, shown in FIG. 7, side panels or wings 76, 78 are folded inward toward an operator (not shown), forming a triptych configuration similar to that of the device of FIGS. 1–3.

Side panels or wings 54, 56 and 76, 78 are half the width of central functional panels 52 and 72, respectively, facilitating stowage in a compact configuration. However, in an alternative design (not illsutrated), full width panels are accommodated by an interleaving of panels 54, 56 on folding against central panel 52, or by a sliding of panels 76, 78 on separate parallel planes inside central panel 72 respectively, at a cost of greater device bulk or by utilization of thinner technically available display panels, at a tradeoff between size, weight and cost.

In parallel alternative embodiments (not shown), a fourth display panel is added to the design of FIGS. 1–3 or 4–6, by hinging the forth panel along a top edge of panel 52, or sliding the forth panel out of a slot opening along a top edge of functional panel 72 respectively, forming in either case a "tetraptych", or four-sided folding display device having a protected compact configuration, and an open configuration revealing inner display screens or surfaces. Input panels 50, 70 continue to function as a base or footing for the respective opened devices.

Yet another embodiment of a compact portable computing device having a larger than usual complement of output screens or display devices in shown generally in a folded configuration in FIG. 8, with functional panels 84, 86, 88 and 90 visible. Outer panels 84, 90, in a folded configuration, are joined by a major hinge 92, while panels 84, 86 and 88,90 are joined at edges opposing the major hinge by minor hinges 96 and 94 respectively.

A partially open or deployed configuration of the computer of FIG. 8 is shown in FIG. 9. Panels 84, 90 are folded apart at approximately a right angle about major hinge 92. In FIG. 10 a further stage of deployment of the computer of FIGS. 8 and 9 is depicted. Panels 86, 88 are opened out about minor hinges 96 and 94 respectively, to reveal inside surfaces of panels 84–90 comprising display screens 98, 100, 102 and input pad or keyboard 112, with trackball 114. In an alternative variation, functional panel 84 would be an input panel also, so that panels 84, 86 would in combination form a folding keyboard or input device, while panels 88, 90 would comprise a two part folding screen. Yet alternatively, one functional panel could be eliminated in the embodiment of FIG. 8 et. seq., forming a three panel device comprising a double display and single input device or panel. This embodiment constitutes a "sideways triptych", wherein a wing panel of an ordinary triptych is deployed as a horizontal base.

Another step of a deployment configuration of the embodiment of FIGS. 8–10 is shown in FIG. 11, wherein wing panels 104, 106, 108, 110, including integral flat displays (not separately designated) are slidingly deployed from sides of functional panels 88, 90. The completely deployed device of FIG. 11 reveals either six or seven useable display screens, depending on whether functional panel 84 constitutes a display or output panel, or else an extension of input panel or keyboard 86.

The principle of a multiple panel display disclosed herein has application to portable telecommunication devices, and in particular, cellular telephones. FIGS. 12–16 and 18 show embodiments relating to cellular telephones. These cell phones, particularly when used to access the Internet, fit the model of a portable computing device comprising one or more panels or leaves, in turn comprising input panels, display panels, and mixed-use functional panels. A typical conventional two-leaf cellular telephone comprises an input panel including a telephone style numeric keypad and a microphone, and an output panel including a speaker and a small alphanumeric display fixed relative to the input panel.

The embodiments shown in FIGS. 12–16 have a folded or compact form substantially like that of FIG. 12, but differ in a number and function of leaves or panels, and in a placement of hinges or other mechanical interconnections between the panels. It will be noted that the embodiments described hereinbelow as well as in the preceding sections sometimes require two rigid panels to be hinged so as to fold in parallel, while leaving a clearance between the panels. In some cases it may be desirable to allow folding with or without an intervening clearance. It may also be advantageous in some embodiments to provide hinging allowing greater than an 180° rotation, particularly hinging having a stable state at 180° and a second stable state at 360°, allowing a first panel to be folded from a position in front of a second panel to a position behind that panel. Hinging embodying either additional clearance between panels or multiple stable hinge positions, or both, which features may be achieved partially by means of spring-loading, may be referred to as relieved hinging. Hinges having multiple stable angular positions and optional clearances, may be referred to as multiple-position relieved hinging. Multiple position relieved hinging is regarded as being in the purview of those of ordinary skill in the art.

A telephone-type computing device 120 shown in FIG. 12 has three leaves or panels 122, 124, 126, with an external hinge 128 joining panels 122, 124. Device 120 is shown in a deployed or open configuration in FIG. 13, a configuration reached from that of FIG. 12 by a first rotation about a hinge 131, and a second rotation about hinge 128. The device includes functional components of a conventional cellular telephone, comprising a keypad 130, a microphone 132, a main alphanumeric display 136, and a speaker 134. In addition, panel 124 has been opened to reveal an auxiliary display 138. Main display 136 provides user feedback on basic telephonic functions and overall device condition, while auxiliary display 138 displays text and images, including email, web pages, and other web based content. The embodiment of FIG. 13 may be implemented in an alternative arrangement (not shown) in which panel 124 is rotatably mounted to a top edge of panel 122, opposite to panel 126, rather than to a side edge as shown.

Device 120 improves on a conventional cellular telephone, which has a small display sharing space with keypad and audio devices on a common panel or panels, by providing a dedicated fold out display panel 124 in a diptych with a standard panel. As a practical matter, however, the embodiment of FIGS. 12 and 13 suffers from the drawback that display panel 124 must be opened in order to use the phone in a conventional way, and the panel is thus placed against a user's head, and possibly interferes with a normal grip of the phone. This difficulty may be addressed by provision of a spring-loaded relieved hinge, previously discussed, allowing a full 360° rotation of panel 124 to a back of panel 122, and out of a user's way. An alternative addressing of these problems is shown in FIGS. 14 and 15.

Device 140 of FIGS. 14, 15 comprises three functional leaves or panels 142, 144, 146, and has a folded appearance similar or identical to that shown in FIG. 12. However, in a partially opened or deployed configuration achieved by a first rotation about a hinge 141, as shown in FIG. 14, ordinary telephonic components are revealed, including a microphone 148, a keypad 150, a speaker 152 and an auxiliary display 154; device 140 in the configuration of FIG. 14 resembles a conventional hand-held cell phone. A further rotation about a hinge 143 however reveals two additional screens 156, 158 on panels 142, 144 respectively (FIG. 15), thus doubling a primary display area relative to the embodiment of FIG. 13, with only a marginal increase in bulk. This gain is achieved by integrating a display panel onto a reverse side of multiple-function panel 142. (A nomenclature of numismatics is adopted, wherein a face opposite a front or primary face is on a "reverse" side, the front or primary face itself being on an "obverse" side).

A further embodiment deploying yet a third display panel is shown generally as device 160 in FIG. 16. Panels 162, 164, 166 are equipped with display screens 162, 164, 166 respectively. Panel 166, or optionally panel 162, is provided with remaining telephonic functional elements (not shown) on an obverse side, similar to panel 142. An additional relevant functionality is optionally incorporated on an obverse side of panel 166 for use with either telephonic or data functions. Optional dual position relieved hinges may be employed at 163, 165 so that closure of panels 162, 166 onto panel 164 is possible in either order, allowing device 160 to be configured as a telephone or a single screen data communications device with an obverse face of either panel 162 or 166 only showing.

A further embodiment of a multiple-display-panel portable computing device utilizes a flexible display screen. Flexible display screens are manufactured by a deposition of light emitting and ancillary circuit elements on a flexible substrate, such as an thin sheet of polyethylene. An extensible employment of a flexible display screen, or simply an extensible flexible display, is shown in FIG. 17. A functional panel is generically indicated at 200. Mounted on a pair of telescoping posts 202 (one shown), a protective enclosure 204 contains a flexible display screen wound on a spring loaded roller (not shown), similar in configuration to a window shade. In deployment, enclosure 204 is pulled outwards from panel 200, extending telescoping posts 202. Anchored at panel 200 and in enclosure 204, the display screen (not shown) deploys by unrolling, and is stretched open by extension of posts 202, which are lockable in an open position.

A device employing an extensible flexible display screen 194 is shown in FIG. 18. Hand held radio receiver or cellular phone 180 includes ordinary telephonic components such as a display 184 and a stub antenna 186. Display screen 194 (not seen in this view) is stored in a side-mounted protective enclosure 188. Enclosure 188 is provided with thumbnail indent 189 and is mounted on telescoping posts 190, 192. In deployment, flexible video screen 194 is extended away from phone 180 and held in place by locks or detents (not shown) on posts 190, 192. An extensible flexible screen arrangement similar to that of FIG. 17 may also be employed in any of the previously disclosed embodiments of portable computing devices, in lieu of a wing or side display panel. An extensible flexible screen may also be added to rigid monolithic "note book" or "note pad" computers—such as the hand-held package tracking devices used by major shipping companies—as an auxiliary output or display device.

It is readily perceivable that additional embodiments may be constructed from functional elements of those embodiments discussed hereinabove, limited only by thinness of economically available flat display devices, and a wieldiness or unwieldiness of a resulting deployed structure. Mechanical variations of the invention are therefore not to be construed to be limited to embodiments explicitly illustrated. Though the invention is conceived primarily in terms of a triptych and of extended arrangements based upon a triptych, in a simplest embodiment the invention may comprise a diptych display panel connected to an input panel. The main display and input panels may be full width, in which case a second display panel either swings out or extends to the side from a conventional laptop configuration, or else display and input panels may be half-width, with input panel similarly divided, so that an essentially cubic shape folds out into a conventional open laptop configuration.

Standard windowing techniques may be utilized to display multiple fields of either locally generated and stored information, remotely accessed information, or a combination of the two. Add-on software and video cards are available for existing computers which support multiple monitors, and appropriate hardware is readily incorporated into a new machine, with operating system patches or firmware making a multiple display windowed GUI transparent to a user. Display control may be implemented by dragging a mouse pointer past a screen edge into an adjacent screen, by special function buttons directing control to that screen, or a combination of these methods. Software enabling multiple mouse pointers is readily developed, enabling pointers to be parked in "busy" screens for instant access by multiple pointer control devices, including mice, trackballs, or cursor keys. Voice activated control is also feasible: A spoken "screen 1" may place a mouse pointer in screen 1. Multiple windows may be displayed on each screen, or else each screen devoted to a single window.

As a usage example, a user might track real time news "wire" services on one screen via an Internet network connection, while composing an article in a word processor active on a central screen or display, and leaving electronic reference works and source documents for the article open on other ancillary screens. Using a high speed Internet connection, active information can be presented as continually updated web pages.

In another possible usage, a surgeon performing diagnosis or surgery in the field might utilize a multiple screen computing device to present multiple perspective views obtained by non-invasive ultrasonic imaging techniques, while monitoring a patient's vital signs on an additional monitor. Alternatively a home knowledge worker might monitor his stock portfolio while composing a technical paper, and leaving a screen open for real time consultation with a distant colleague.

In summary, a portable personal computing device deploying multiple folding display and input panels, along with available software for simultaneous presentation of data from several sources, can replace a variety of display and monitoring devices in the field while increasing an efficiency of operator utilization in all situations by an efficient display of multiple data sources, eliminating a need to switch between sources on a single display, without simultaneously requiring a cumbersome transport and setup of multiple independent display devices. The instant class of devices will therefore find many applications among individuals engaged in multi-tasking, and benefiting from a portable simultaneous display of multiple data sources.

What is claimed:

1. A portable computing device comprising;

an input panel;

a functional panel;

a first output panel; and two slidingly deployable side display panels on opposite sides of the output panel, wherein the input panel is rotatably connected to the functional panel along a first common edge, and the output panel is rotatably connected to the functional panel along a second common edge substantially parallel to and opposite from the first common edge along the functional panel, further comprising a second output panel rotatably connected to the output panel along a third common edge substantially parallel and opposite to the second common edge along the first output panel.

2. The device of claim 1 wherein the input, functional and first output panels are mounted so as to be alternatively arrangeable into a substantially flat closed configuration and in an open configuration in a form of two substantially vertical panels disposed above a horizontal base.

3. The device of claim 1 wherein the input, functional and first and second output panels are mounted so as to be alternatively arrangeable into a substantially flat closed configuration and in an open configuration in a form of two substantially vertical panels disposed above two substantially horizontal panels forming a base.

4. The device of claim 1 wherein the functional panel is an output panel.

5. The device of claim 1 wherein the functional panel is an input panel.

6. A hand-holdable telecommunication device, comprising:

an input panel;

an output panel; and a first display panel;

wherein the input panel is contiguous with the output panel and the display panel is movably mounted to at least one of the input panel and the output panel, wherein the output panel includes a second display panel, and the telecommunication device can be configured to present two contiguous display panel faces, further comprising a third display panel, wherein the telecommunication device can be configured to present two contiguous display panel faces.

7. The telecommunication device of claim 6 wherein the output panel is rotatably mounted to the input panel.

8. The telecommunication device of claim 6 wherein the first display panel is an extensible flexible display.

* * * * *